(12) United States Patent
Holliday

(10) Patent No.: US 9,621,824 B2
(45) Date of Patent: Apr. 11, 2017

(54) THERMAL IMAGER

(71) Applicant: CorDEX Instruments Limited, Middlesborough, Cleveland (GB)

(72) Inventor: Antony James Holliday, Middlesborough (GB)

(73) Assignee: CorDEX Instruments Limited, Middlesborough (GB)

( * ) Notice: Subject to any disclaimer, the term of this patent is extended or adjusted under 35 U.S.C. 154(b) by 299 days.

(21) Appl. No.: 14/045,063

(22) Filed: Oct. 3, 2013

(65) Prior Publication Data

US 2014/0098236 A1     Apr. 10, 2014

(30) Foreign Application Priority Data

Oct. 5, 2012   (GB) .................................. 1217913.1
Nov. 22, 2012  (GB) .................................. 1220994.6

(51) Int. Cl.
| | | |
|---|---|---|
| *H04N 5/33* | (2006.01) | |
| *G01J 5/02* | (2006.01) | |
| *G01J 5/08* | (2006.01) | |
| *G01J 5/00* | (2006.01) | |

(52) U.S. Cl.
CPC .............. *H04N 5/33* (2013.01); *G01J 5/026* (2013.01); *G01J 5/0834* (2013.01); *G01J 2005/0077* (2013.01)

(58) Field of Classification Search
CPC ........................................................ H04N 5/33
See application file for complete search history.

(56) References Cited

U.S. PATENT DOCUMENTS

| | | | | |
|---|---|---|---|---|
| 5,027,150 | A * | 6/1991 | Inoue | G03B 7/26 396/301 |
| 7,484,885 | B1 * | 2/2009 | Carlson | G01J 5/02 250/338.1 |
| 2003/0224735 | A1 * | 12/2003 | Moursund | H04B 10/43 455/73 |
| 2004/0065822 | A1 | 4/2004 | Cope | |
| 2005/0135800 | A1 | 6/2005 | Nguyen et al. | |
| 2006/0049352 | A1 | 3/2006 | Irani | |
| 2008/0099679 | A1 * | 5/2008 | Takemura et al. | 250/332 |
| 2012/0026337 | A1 * | 2/2012 | Boulanger | G01J 5/046 348/164 |
| 2013/0048855 | A1 * | 2/2013 | Abreo | H04N 5/33 250/330 |
| 2015/0097944 | A1 * | 4/2015 | Palm | G01N 25/72 348/129 |

OTHER PUBLICATIONS

UK Search Report, dated Mar. 12, 2013, received in connection with Application No. GB1220994.3, filed Nov. 22, 2012.

* cited by examiner

*Primary Examiner* — James Pontius
(74) *Attorney, Agent, or Firm* — Meunier Carlin & Curfman LLC

(57) ABSTRACT

A thermal imager includes a detector, a lens, a shutter disposed between the detector and the lens, and a motor operably connected to the shutter for moving the shutter between a first and a second position. There is a source of electrical energy operably connected to one or more of the detector, lens and motor by an electrical circuit. The electrical circuit includes one or more of a capacitor, a diode, and a resistor.

19 Claims, 2 Drawing Sheets

THERMAL IMAGER

FIELD OF INVENTION

The present invention relates to a thermal imager, also known as a thermal imaging, thermographic or infrared camera.

BACKGROUND

A thermal imager detects infrared radiation emitted from an object or scene within its field of view. It converts the infrared radiation emitted into electrical signals that are displayed on a screen. Thermal imagers convert infrared radiation into visible light. Thermal imagers typically operate at wavelengths from 7,500 to 14,000 nm or 7.5 to 14 µm. Two objects or areas of a scene at the same temperature are displayed on a screen using the same colour.

Some thermal imagers can calculate the temperature of an object, taking into account the objects emissivity, ambient humidity, reflected temperature and the distance between the object and the thermal imager.

Thermal imagers are commonly used to inspect electrical equipment. The thermal imager is used to measure infrared radiation or heat produced by the electrical equipment and converts the measurements into a visible image. Regular inspections of the electrical equipment allow an operator to compare successive readings and thereby detect when the thermal images produced vary over time. An increased thermal reading indicates the particular area of the electrical equipment is heating up and is therefore prone to failure. A thermal imager can therefore be used to provide an early warning system for component failure and help organise a service regime that concentrates on components that are failing and need replacement.

Thermal imagers often use a bolometer, specifically a microbolometer, as a detector to convert the infrared radiation emitted by an object into visible light. The microbolometer measures the energy on incident electromagnetic radiation and is typically a grid of heat sensors comprising vanadium oxide or amorphous silicon. On top of these heat sensors is a grid of silicon. Infrared radiation that strikes the vanadium oxide changes its electrical resistance and this change is measured and used to generate the visual image.

Microbolometers do not require cooling and so are commonly used as the detector in handheld thermal imagers when it would be difficult to cool the detector using, for example, liquid nitrogen.

Some thermal imagers are required to be used in hazardous and/or explosive atmospheres. Special consideration must be given to the arrangement of the component parts of such thermal imagers so that they are intrinsically safe.

BRIEF SUMMARY

According to a first aspect of the present invention, there is provided a thermal imager that comprises: a detector; a lens; a shutter disposed between the detector and the lens; a motor operably connected to the shutter for moving the shutter between a first and a second position; and a source of electrical energy operably connected to one or more of the detector, lens and motor by an electrical circuit. The electrical circuit comprises one or more of a capacitor, a diode, and a resistor.

In use, the electrical energy is passable through one or more of the capacitor, diode, and resistor.

The electrical energy may be an electrical current. The one or more of the capacitor, diode, and resistor may help to control one or more of the capacitance, voltage, and inductance of electrical energy in the electrical circuit. Controlling one or more of the capacitance, voltage, and inductance of electrical energy may include reducing one or more of the capacitance, voltage, and inductance of electrical energy. A reduction in the voltage, from for example above or equal to 5 volts to below 5 volts, may render the voltage nonincendiary, that is not incendiary and therefore not capable of causing a fire.

When the shutter is in the first position it is typically between the detector and the lens, thereby inhibiting the transfer of infrared radiation between the lens and the detector. When the shutter is in the second position it is typically located such that infrared radiation can be transmitted between the lens and the detector.

To move the shutter between the first and second positions, the motor typically needs a torque of from 2 N/mm to 10 N/mm. The required torque typically means that the capacitance of the motor needs to be increased and/or the voltage of the electrical energy supplied to the motor needs to be increased. The voltage may be increased from less than or equal to 3 volts to greater than or equal to 4.5 volts. Controlling the supply of electrical energy at an increased voltage between the source of electrical energy and the one or more of the capacitor, diode, and resistor is necessary if the thermal imager is to be intrinsically safe.

The thermal imager is typically intrinsically safe, that is the thermal imager may be safe for operation in a hazardous and/or explosive atmosphere or area. Intrinsic safety may require the electrical energy supplied to one or more of the detector, lens and motor, that is a source of ignition, to be controlled and/or limited.

To be intrinsically safe the thermal imager typically has power limitations that require any electrical current used to be less than or equal to 0.3 A and/or any voltage to be less than or equal to 3.3 VDC.

The infrared radiation may be electromagnetic radiation having a wavelength from 7,500 to 14,000 nm (7.5 to 14 µm).

The thermal imager may include a processor for processing data collected by the detector. The processor may process the data such that the data is suitable for displaying on an electronic visual display or screen.

The detector is typically adapted to measure the temperature of an object in front of the lens. This may be in addition to detecting infrared radiation emitted by the object. The lens may focus infrared radiation emitted by an object in front of the lens onto a surface of the detector. Focusing the infrared energy may include directing the infrared energy onto the surface of the detector.

The surface of the detector may include a series of heat sensors comprising vanadium oxide or amorphous silicon. The detector may include a layer of silicon. The detector may be a microbolometer. The microbolometer may be an infrared Focal Plane Array (FPA) detector. The FPA may comprise a plurality of light sensing pixels at a focal plane of the lens. The focal plane of the lens may be the detector. The detector may comprise an array of individual detectors or pixels. There may be 320×240 pixels.

FPA detectors often degrade over time caused by 'drift' in the array. When this degradation occurs, an accurate recording of the thermal image of an object in front of the lens may not be possible. A Non-uniformity Correction (NUC) may be used to recalibrate the array. The NUC may include moving the shutter between the first and second positions.

An image displayed on the screen may have had the NUC applied to the data of that image. The NUC may correct the residual fixed pattern noise of the array or data collected by the detector.

The shutter may be L-shaped. The shutter may have at a first and a second surface. When the shutter is in the first position the first surface may face the detector. The first surface may have a high emissivity, that is an emissivity close to 1. The first surface may be one or more of black, be roughly textured, and have a matt-finish.

The thermal imager may be housed in a casing. The casing may be spark-proof, that is the casing comprises a material that is not damaged by sparks. The casing may be shock-proof, that is the casing that can withstand the impact of being dropped from a height up to 2 m on to a hard surface.

The motor may be a piezoelectric motor.

The motor may be referred to as a Non-Uniformity Correction (NUC) motor. The motor may be a two-phase stepper motor. The two-phase stepper motor may be a 3.3V Direct Current (DC) two-phase stepper motor. The two-phase stepper motor may comprise at least one coil. Typically the two-phase stepper motor comprises at least two coils. The at least one coil may have an inductance of from 2.4 to 3.6 mH and typically 3 mH. The at least one coil may have a resistance of from 12 to 18 ohms and typically 15 ohms.

The shutter may be referred to as a paddle. Movement of the shutter may be mechanical. The shutter may be used to recalibrate the detector.

The two-phase stepper motor may be controlled and/or driven by a dual H-bridge controller.

The resistor may be a current limiting resistor and may be used to limit the electrical energy or power supplied to the two-phase stepper motor by the electrical circuit.

Parameters of the Non-Uniformity Correction (NUC) may be defined and/or controlled by a controller board. The controller board may measure the inductance and/or capacitance of the electrical circuit. The controller board may control the inductance and/or capacitance of the electrical energy supplied to the motor. The inductance of the at least one coil of the motor may determine the inductance and/or capacitance of the motor.

When the two-phase stepper motor comprises at least two coils, each of the coils may be an inductor. The inductor may be referred to as a choke. The inductor may store the electrical energy in the form of a magnetic field. The at least two coils may each have a first and a second end.

The capacitor may store the electrical energy in the form of an electric field. The resistor may dissipate the electrical energy as heat. The diode may allow the flow of electrical energy in a first direction and/or may restrict the flow of electrical energy in a second direction. The second direction may be opposed to the first direction.

When the two-phase stepper motor comprises at least two coils, each coil may comprise a single coil inductor. In use, each coil may have an inductance of 6 mH. In use, each coil may have an electric charge of 115.5 mA. The inductance and the electric charge may be suitable for use in an explosive atmosphere. The inductance and the electric charge may satisfy the requirements of BS EN 60079-10.

Using the capacitor, the inductance may be reduced to 3 mH. The reduced inductance may satisfy the requirements of BS EN 60079-11 10.1.5.2.

The voltage in the electrical circuit may be 4.5 volts. The resistance in the electrical circuit may be less than or equal to 39 ohms. Typically each coil of the two-phase stepper motor has a resistance of 15 ohms. Typically the remaining or external resistance is less than or equal to 24 ohms. The remaining or external resistance may be the resistance of the electrical charge that a surrounding environment, that may be an explosive environment, and/or surrounding electronic equipment may be exposed to.

The thermal imager and/or electrical circuit of the thermal imager may comprise two or more protection systems. The two or more protection systems may be in parallel in the electrical circuit. The two or more protection systems may comprise the resistor of the electrical circuit.

The motor and the motor controller may be connected by one or more pairs of wires. The one or more pairs of wires may be referred to as a phase. The motor controller and the motor may be connected by two pairs of wires. The first pair of wires may be referred to as a first phase and the second pair of wires may be referred to as a second phase. Each wire of the one or more pairs of wires may be connected to opposite ends of the at least one coil.

The resistor may be connected to the one or more pairs of wires. The resistor is typically in electrical communication with the motor controller and the motor. There may be at least one resistor connected inline to each of the wires of the first pair of wires or first phase. There may be at least one resistor connected inline to each of the wires of the second pair of wires or phase. There may be a total of four resistors connected to two pairs of wires providing electrical communication between the motor controller and the motor and may be more specifically between the motor controller and each of the first and second ends of each of the at least two coils. The electrical circuit may comprise the four resistors, one resistor in electrical communication with each of the first and second ends of each of the at least two coils.

In the event of a failure of the at least two coils, the one or more resistors may limit the electrical charge that can pass between the motor controller and the motor. If both the at least two coils fail, the motor and/or surrounding environment may be exposed to a total inductance of less than or equal to 6 mH and/or a total resistance of less than or equal to 30 ohms.

It is an advantage of various implementations of the present invention that if one of the at least two resistors connected inline to one of the first pair or the second pair of wires fails, the other resistor of the at least two resistors provides the necessary fail-safe and limits the electrical charge that can pass between the motor controller and the motor or vice versa and/or surrounding environment.

The at least two coils may have a combined inductance of 12 mH and an electric charge of 81.65 mA. The inductance and the electric charge may be suitable for use in an explosive atmosphere. The inductance and the electric charge may satisfy the requirements of BS EN 60079-10. Using the capacitor, the inductance may be reduced to 6 mH. The reduced inductance may satisfy the requirements of BS EN 60079-11 10.1.5.2.

The voltage in the electrical circuit may be less than or equal to 4.5 volts. The resistance in the electrical circuit may be less than or equal to 55.2 ohms. Typically the combined resistance of the at least two coils of the two-phase stepper motor is 30 ohms. Typically the remaining or external resistance is less than or equal to 25.2 ohms.

The minimum resistance of each coil may be 25.5 ohms. The maximum power carried by each coil may be 1.33 W. The maximum power of the electrical energy carried per wire of a pair of wires or phase may be 0.66 W. The maximum power rating per wire of a pair of wires may be 0.75 W, that is it may be greater than 0.66 W.

The at least one resistor and/or may be each of the four resistors may have one or more of a resistance of 12.7 ohms, a power rating of 0.75 W and a size of 2010.

According to a second aspect of the present invention there is provided a method of obtaining a thermal image using a thermal imager in a hazardous environment, the method including the steps of:

providing a motor for operating a shutter in a thermal imager and a source of electrical energy for powering the motor;

providing an electrical connection between the motor and the source of electrical energy;

providing one or more of a capacitor, a diode, and a resistor in the electrical connection; and passing the electrical energy through one or more of a capacitor, a diode, and a resistor in the electrical connection between the motor and the source of electrical energy.

The method may further include limiting the resistance of the electrical energy to less than or equal to 12.7 ohms.

The thermal imager may include a detector and a lens. The method may include the step of moving the shutter between a first and a second position, wherein in the first position the shutter is typically between the detector and the lens, thereby inhibiting the transfer of infrared radiation between the lens and the detector. When the shutter is in the second position it is typically located such that infrared radiation can be transmitted between the lens and the detector.

The method may include the step of using the detector to collect infrared data from infrared radiation passing through the lens when the shutter is in the second position. The infrared data detected being a first data set.

The method may also include the step of using the detector to collect infrared data from infrared radiation emitted from a surface of the shutter when the shutter is in the first position.

The method may include the step of comparing and/or processing the first and second data sets to calculate a Non Uniformity Correction (NUC) that can be used to recalibrate the detector.

The method may provide a way of safely completing a Non Uniformity Correction (NUC) when the thermal imager is in a hazardous environment. The method may be intrinsically safe.

The hazardous environment may be an explosive environment.

Optional features of the first aspect of the present invention may be incorporated into the second aspect of the present invention and vice versa.

BRIEF DESCRIPTION OF THE DRAWINGS

An embodiment of the present invention will now be described, by way of example only, with reference to the accompanying FIGS. 1 and 2.

DETAILED DESCRIPTION

Figure 1:
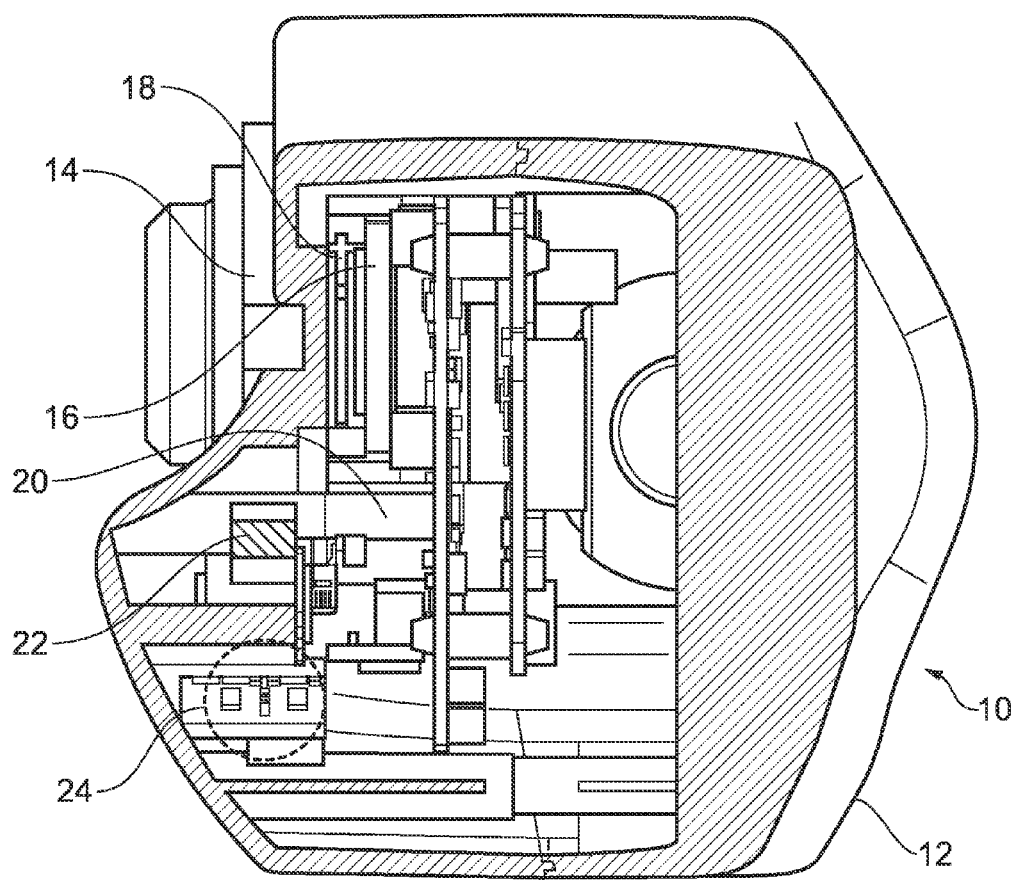
FIG. 1 shows a cross-section of a thermal imager 10 in accordance with one implementation of the present invention. A casing 12 houses the components of the thermal imager 10 described in more detail below. A lens 14 penetrates the casing 12.

FIG. 1 shows the thermal imager 10. Inside the casing 12 a detector 16 is positioned in line with the lens 14. Between the lens 14 and the detector 16 and also inside the casing 12, there is a shutter 18. The shutter 18 is attached to a motor 22 by a spindle 20. When the motor 22 operates, it turns the spindle 20 that moves the shutter 18 either between or out from between the lens 14 and the detector 16.

The shutter 18 may be referred to as a paddle. The shutter 18 is L-shaped, such that the long arm of the L-shaped shutter 18 extends vertically from adjacent to the lens 14 and the detector 16 to the spindle 20, and the short arm of the shutter 18 fills the gap between the lens 14 and the detector 16.

Components 24 include a battery to store electrical energy, capacitors, diodes, and resistors. The battery is connected to the motor 22. In use, electrical energy from the battery passes through the capacitors, diodes, and resistors to control the capacitance, voltage, and inductance of electrical energy supplied by the battery to the motor 22. By controlling the capacitance, voltage, and inductance of electrical energy, the capacitance, voltage, and inductance are reduced to below the nonincendiary level required for an intrinsically safe system.

In use, the thermal imager 10 uses the lens 14 with the corresponding infrared microbolometer detector 16, including an infrared focal plane array (FPA) (not shown) to provide a visible infrared image of an object or scene in front of the lens 14 on a screen (not shown). Infrared radiation (not shown) enters the thermal imager 10 through the lens 14 and is directed onto the FPA of the detector 16.

The FPA includes a plurality of light sensing pixels (not shown) at the focal plane of the lens 14. The focal plane of the lens 14 is the surface of detector 16 facing the lens 14. Each pixel responds to the infrared energy or thermal energy it receives, thereby changing its resistance. The visible thermal image relayed to a screen (not shown) is generated by measuring the changing resistance of the pixels.

The thermal image generated will normally show a fixed pattern noise caused by non-uniformities between the pixels. Physical variations between the pixels, stray energy detected by the FPA, and the temperature of the thermal imaging equipment affect the non-uniformities of the pixels. It is necessary therefore to regularly perform a non-uniformity correction (NUC) to mitigate the effects of the fixed pattern noise.

The non-uniformity correction (NUC) is performed by moving the shutter 18 in between the lens 14 and detector 16, so as to position the shutter in front of the detector 18 and block the surface of the detector 16 from any infrared energy leaving the lens 14. The motor 22 is used to move the shutter 18. To be intrinsically safe, the electrical energy supplied to the motor 22 passes through the capacitors, diodes, and resistors as described above.

Figure 2:
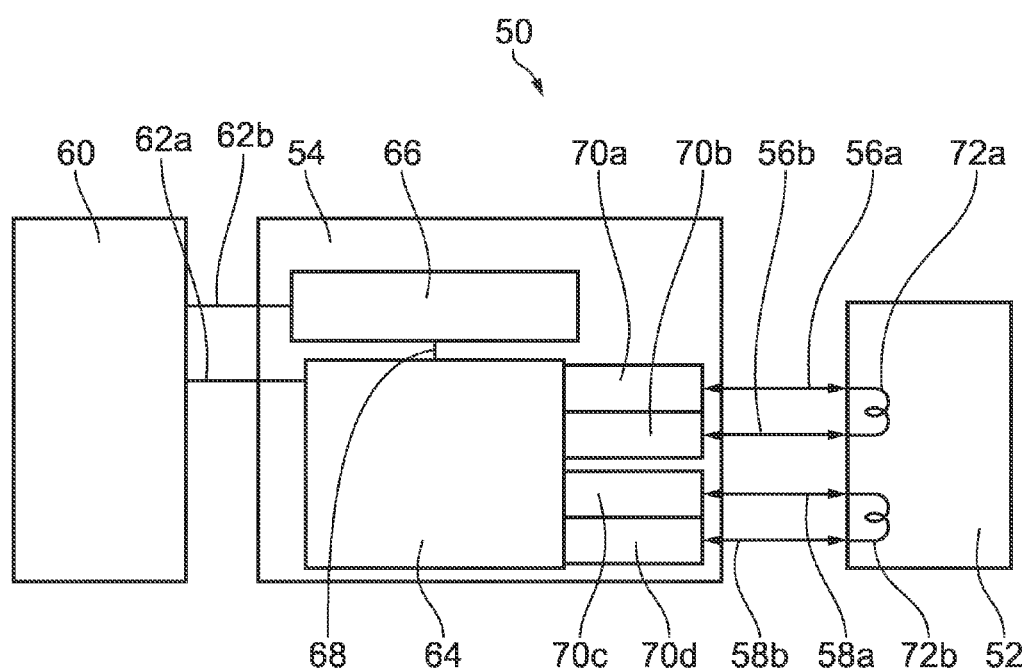
FIG. 2 shows the electrical circuit in accordance with one implementation of the present invention.

FIG. 2 shows the electrical circuit. The motor 52 is connected to a non-uniformity correction (NUC) controller board 54 by phase one wires 56a & 56b and phase two wires 58a & 58b. The non-uniformity correction (NUC) controller board 54 is connected to a Digital Signal Processing (DSP) or sensor board 60 by power and data cables 62a & 62b.

The non-uniformity correction (NUC) controller board 54 includes a motor controller 64 and four signal (shunt) barriers 66. The motor controller 64 and four signal (shunt) barriers 66 are connected by conductive pathways 68.

Power cable 62a connects the Digital Signal Processing (DSP) or sensor board 60 to the motor controller 64. Power cable 62b connects the Digital Signal Processing (DSP) or sensor board 60 to the four signal (shunt) barriers 66.

The electrical circuit and more specifically the motor controller 64 includes four resistors 70a, 70b, 70c and 70d. One end of the phase one wire 56a is connected to the resistor 70a; one end of the phase one wire 56b is connected to the resistor 70b; one end of the phase two wire 58a is connected to the resistor 70c; and one end of the phase two wire 58b is connected to the resistor 70d.

The motor 52 has two coils 72a & 72b. The other end of the phase one wire 56a is connected to one end of the coil 72a; the other end of the phase one wire 56b is connected to the other end of the coil 72a. The other end of the phase two wire 58a is connected to one end of the coil 72b; the other end of the phase two wire 58b is connected to the other end of the coil 72b.

The motor 52 may be a non-uniformity correction (NUC) motor. The motor controller 64 may be a stepper motor controller and/or a dual H-bridge controller.

In use, the non-uniformity correction (NUC) controller board 54 receives electrical power and/or electronic data from the Digital Signal Processing (DSP) or sensor board 60 via power and data cables 62a & 62b. In response the electronic data received from the Digital Signal Processing (DSP) or sensor board 60, the non-uniformity correction (NUC) controller board 54 provides electrical power to the coils 72a & 72b of the motor 52 via phase one wires 56a & 56b and phase two wires 58a & 58b. The electrical power to the coils 72a & 72b also passes through the four resistors 70a, 70b, 70c and 70d. The electrical power to the coils 72a & 72b moves the shutter (shown in FIG. 1) between the first and the second positions.

If an electrical fault develops between the motor 52 and the non-uniformity correction (NUC) controller board 54, the four resistors 70a, 70b, 70c and 70d limit the exposure of the surrounding environment, that may be an explosive environment, and/or surrounding electronic equipment to an electrical charge having a voltage of less than or equal to 4.5 volts, a resistance of less than or equal to 30 ohms, and an inductance of less than or equal to 6 mH.

In use, each coil 72a & 72b has an inductance of 3 mH, a resistance of 15 ohms and can carry an electric charge of 115.5 mA. The phase one wires 56a & 56b and phase two wires 58a & 58b can carry a voltage of 4.5 volts.

Improvements and modifications to the thermal imager described herein may be made without departing from the scope of the present invention.

The invention claimed is:

1. A thermal imager comprising:
   a detector,
   a lens,
   a shutter disposed between the detector and the lens,
   a motor operably connected to the shutter for moving the shutter between a first and a second position, the motor being a two-phase stepper motor, and
   a source of electrical energy operably connected to one or more of the detector, lens and motor by an electrical circuit,
   wherein the electrical circuit comprises one or more of a capacitor, a diode, and a resistor and the one or more of the capacitor, diode, and resistor reduce one or more of a capacitance, voltage, and inductance of the electrical energy in the electrical circuit to below a nonincendiary level required for intrinsic safety, and
   wherein the two-phase stepper motor comprises at least two coils, each coil having a first and a second end and wherein the electrical circuit comprises four resistors, one resistor in electrical communication with each of the first and second ends of each of the at least two coils.

2. A thermal imager according to claim 1, wherein the voltage is reduced from above or equal to 5 volts to below 5 volts, and thereby the reduced voltage is nonincendiary.

3. A thermal imager according to claim 1, wherein the detector is a micro bolometer.

4. A thermal imager according to claim 3, wherein the microbolometer is an infrared Focal Plane Array (FPA) detector comprising a plurality of light sensing pixels.

5. A thermal imager according to claim 4, wherein the Focal Plane Array (FPA) detector comprises 320×240 pixels.

6. A thermal imager according to claim 1, wherein the two-phase stepper motor is a 3.3 volt Direct Current (DC) two-phase stepper motor.

7. A thermal imager according to claim 1, wherein each of the at least two coils has an inductance of from 2.4 to 3.6 mH.

8. A thermal imager according to claim 1, wherein each of the at least two coils has a resistance of from 12 to 18 ohms.

9. A thermal imager according to claim 1, wherein each of the at least two coils is a single coil inductor.

10. A thermal imager according to claim 1, wherein each of the four resistors has a resistance of less than or equal to 12.7 ohms.

11. A thermal imager according to claim 1, wherein each of the four resistors has a power rating of less than or equal to 0.75 W.

12. A thermal imager according to claim 1, wherein each of the four resistors has a size of 2010.

13. A thermal imager according to claim 1, wherein the voltage is reduced from 5 volts to below 5 volts, and thereby the reduced voltage is nonincendiary.

14. A method of obtaining a thermal image using a thermal imager in a hazardous environment, the method including the steps of:
   providing a motor for operating a shutter in a thermal imager and a source of electrical energy for powering the motor, the motor being a two-phase stepper motor, wherein the two-phase stepper motor comprises at least two coils, each coil having a first and a second end and wherein the electrical circuit comprises four resistors, one resistor in electrical communication with each of the first and second ends of each of the at least two coils,
   providing an electrical connection between the motor and the source of electrical energy,
   providing one or more of a capacitor, a diode, and a resistor in the electrical connection, and
   passing the electrical energy through one or more of a capacitor, a diode, and a resistor in the electrical connection between the motor and the source of electrical energy to reduce one or more of a capacitance, voltage, and inductance of the electrical energy in the electrical connection to below a nonincendiary level required for intrinsic safety.

15. A method of obtaining a thermal image according to claim 14, wherein the method further includes using the diode to limit the resistance of the electrical energy to less than or equal to 12.7 ohms.

16. A method of obtaining a thermal image according to claim 14, wherein the thermal imager includes a detector and a lens, the method including the step of moving the shutter between a first and a second position, wherein in the first position the shutter is between the detector and the lens, thereby inhibiting the transfer of infrared radiation between the lens and the detector.

17. A method of obtaining a thermal image according to claim 16, wherein the method includes the step of using the detector to collect infrared data from infrared radiation passing through the lens when the shutter is in the second position.

18. A method of obtaining a thermal image according to claim 16, wherein the method includes the step of using the detector to collect infrared data from infrared radiation emitted from a surface of the shutter when the shutter is in the first position.

19. A thermal imager comprising:
  a casing holding a detector, a lens, a shutter disposed between the detector and the lens, and an electrical circuit operating the thermal imager at non-incendiary levels of electrical energy;
  a motor operably connected to the shutter for moving the shutter between a first and a second position, the motor being a two-phase stepper motor, and
  a source of electrical energy operably connected to the motor by the electrical circuit,
  wherein the electrical circuit comprises one or more of a capacitor, a diode, and a resistor connected to the motor, and the one or more of the capacitor, diode, and resistor reduce one or more of a capacitance, voltage, and inductance of the electrical energy directed to the motor from the electrical circuit to below a non-incendiary level required for intrinsic safety.

* * * * *